(12) United States Patent
Kumar Nath

(10) Patent No.: US 7,933,919 B2
(45) Date of Patent: Apr. 26, 2011

(54) ONE-PASS SAMPLING OF HIERARCHICALLY ORGANIZED SENSORS

(75) Inventor: Suman Kumar Nath, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 427 days.

(21) Appl. No.: 11/948,667

(22) Filed: Nov. 30, 2007

(65) Prior Publication Data

US 2009/0144011 A1   Jun. 4, 2009

(51) Int. Cl.
   *G06F 7/00* (2006.01)
   *G06F 17/30* (2006.01)
(52) U.S. Cl. ............ 707/769; 711/716; 702/127
(58) Field of Classification Search .......... 707/705, 707/778, 769; 711/117–118, 133, 116
   See application file for complete search history.

(56) References Cited

U.S. PATENT DOCUMENTS

| | | | |
|---|---|---|---|
| 7,143,083 B2 | 11/2006 | Carlbom et al. | |
| 2002/0087570 A1 | 7/2002 | Jacquez et al. | |
| 2004/0024773 A1 | 2/2004 | Stoffel et al. | |
| 2004/0218602 A1* | 11/2004 | Hrastar | 370/390 |
| 2004/0220965 A1 | 11/2004 | Harville et al. | |
| 2005/0055376 A1 | 3/2005 | Xie et al. | |
| 2005/0096841 A1 | 5/2005 | Gedik et al. | |
| 2005/0120013 A1 | 6/2005 | Chang et al. | |
| 2005/0137994 A1 | 6/2005 | Fortin et al. | |
| 2006/0161645 A1* | 7/2006 | Moriwaki et al. | 709/223 |
| 2006/0271661 A1* | 11/2006 | Qi et al. | 709/223 |
| 2007/0088719 A1 | 4/2007 | Staniford et al. | |
| 2007/0270672 A1* | 11/2007 | Hayter | 600/309 |
| 2008/0071465 A1* | 3/2008 | Chapman et al. | 701/117 |
| 2008/0104530 A1* | 5/2008 | Santanche et al. | 715/764 |
| 2008/0195584 A1* | 8/2008 | Nath et al. | 707/3 |
| 2009/0012633 A1* | 1/2009 | Liu et al. | 700/90 |
| 2009/0063099 A1* | 3/2009 | Counts et al. | 702/188 |
| 2009/0224941 A1* | 9/2009 | Kansal et al. | 340/870.06 |

FOREIGN PATENT DOCUMENTS

| | | |
|---|---|---|
| WO | WO2006097734 A1 | 9/2006 |
| WO | WO2007087615 A2 | 8/2007 |

OTHER PUBLICATIONS

Ganesan et al., "Multiresolution Storage and Search in Sensor Networks", ACM Transactions on Storage, vol. 1, No. 3, Aug. 2005, ACM 2005, pp. 277-315.*
Google Maps. http://maps.google.com/. Last accessed Feb. 19, 2008, 1 page.
Windows Live Local. http://local.live.com/. Last accessed Feb. 19, 2008, 1 page.

(Continued)

*Primary Examiner* — Luke S. Wassum
*Assistant Examiner* — Susan F Rayyan
(74) *Attorney, Agent, or Firm* — Turocy & Watson, LLP

(57) ABSTRACT

One-pass sampling is employed within a hierarchically organized structure to efficiently and expeditiously respond to sensor inquires. Identification of relevant sensors and sampling of those sensors is combined and performed in a single pass. Oversampling can also be employed to ensure a target sample size is met where some sensors fail or are otherwise unavailable. Further yet, sensor data can be cached and utilized to hasten processing as well as compensate for occasional sensor unavailability.

20 Claims, 14 Drawing Sheets

OTHER PUBLICATIONS

Kate Greene. Microsoft's plan to map the world in real time. MIT Technology Review, May 8, 2006 http://www.technologyreview.com/read\_article.aspx?id=16781&ch=infotech. Last accessed Feb. 19, 2008, 2 pages.

Christian Böhm, et al. Multidimensional index structures in relational databases. Journal of Intelligent Information Systems., 15(1):51-70, 2000. Last accessed Dec. 11, 2007, 21 pages.

Amol Deshpande, et al. MauveDB: Supporting Modelbased User Views inDatabase Systems, SIGMOD 2006, Jun. 27-29, 2006, Chicago, Illinois, USA, ACM 1595932569/06/0006. Last accessed Dec. 11, 2007, 12 pages.

Amol Deshpande, et al. Cache-and-query for wide area sensor databases. In ACM SIGMOD, 2003, San Diego, California USA. Last accessed Dec. 11, 2007, 12 pages.

Jim Gray, et al. The Five-Minute Rule Ten Years Later,and Other Computer Storage Rules of Thumb. Sep. 1997, Technical Report, MSR-TR-97-33. SIGMOD Record 26(4): 63-68 (1997). http://research.microsoft.com/~gray/5_min_rule_SIGMOD.doc. Last accessed Dec. 11, 2007, 7 pages.

David Gross, et al. Uniform Generation in Spatial Constraint Databases and Applications, In ACM PODS, 2000.

A. Guttman. R-trees: A dynamic index structure for spatial searching. In SIGMOD, pp. 47-57, 1984. ACM O-89791-128-8/84/006/0047. Last accessed Dec. 11, 2007, 11 pages.

A.K.Jain, et al. Data Clustering: A Review, ACM Computing Surveys, vol. 31, No. 3, Sep. 1999. Last accessed Dec. 11, 2007, 60 pages.

I. Kamel, et al. On Packing R-trees. In CIKM, 1993. Last accessed Dec. 11, 2007, 20 pages.

I. Lazaridis, et al. Progressive approximate aggregate queries with a multi-resolution tree structure. In SIGMOD, 2001. Last accessed Dec. 11, 2007, 28 pages.

M. F. Mokbel, et al. Spatio-temporal Access Methods. IEEE Data Engineering Bulletin., 26(2):40-49, 2003. Last accessed Dec. 11, 2007, 11 pages.

A. Nanopoulos, et al. An Efficient and Effective Algorithm for Density Biased Sampling. CIKM'02, Nov. 4-9, 2002, McLean, VA, USA. ACM 1-58113-492-4/02/0011. Last accessed Dec. 11, 2007, 7 pages.

Suman Nath, et al. FlashDB: Dynamic Self-tuning Database for NAND Flash. In IPSN, 2007, Apr. 25-27, 2007, Cambridge, Massachusetts, USA. ACM 978-1-59593-638-7/07/0004. Last accessed Dec. 11, 2007, 10 pages.

Frank Olken, et al. Sampling from Spatial Databases. In ICDE,1993. 1063-6382/93 IEEE. Last accessed Feb. 19, 2008, 10 pages.

D. Papadias, et al. Indexing Spatio-Temporal Data Warehouses, 2002. Last accessed Dec. 11, 2007, 10 pages.

J. Yang, et al. Incremental Computation and Maintenance of Temporal Aggregates. The VLDB Journal (2003) 12:262-283 / Digital Object Identifier (DOI) 10.1007/s00778-003-0107-z. Published online: Sep. 17, 2003. Last accessed Dec. 11, 2007, 22 pages.

Y. Zhang, et al. ICEDB: Intermittently-Connected Continuous Query Processing. In ICDE, 2007. Last accessed Dec. 11, 2007, 10 pages.

Suman Nath, et al. Challenges in Building a Portal for Sensors WorldWide. WSW'06 at SenSys'06, Oct. 31, 2006, Boulder, Colorado, USA. ACM 1595933433/06/0011. http://research.microsoft.com/nec/publications/SensorMap_WSW2006.pdf. Last accessed Aug. 30, 2007, 5 pages.

Donghui Zhang, et al. Temporal and Spatio-Temporal Aggregations over Data Streams using Multiple Time Granularities http://citeseer.ist.psu.edu/cache/papers/cs2/459/http:zSzzSzwww.ccs.neu.eduzSzhomezSzdonghuizSzpublicationszSzhta_journal.pdf/zhang03temporal.pdf. Last accessed Aug. 30, 2007, 25 pages.

Deepak Ganesan, et al. Dimensions: Why Do We Need a New Data Handling Architecture for Sensor Networks? ACM SIGCOMM Computer Communications Review, vol. 33, No. 1: Jan. 2003. http://delivery.acm.org/10.1145/780000/77486/p143-ganesan.pdf?key1=774786&key2=051792881&coll=GUIDE&dl=GUIDE&CFID=28055539&CFTOKEN=22210286. Last accessed Aug. 30, 2007, 6 pages.

\* cited by examiner

1: $sample \leftarrow \emptyset$
2: $nodes \leftarrow PriorityQueue()$
3: $insert(nodes, R, root)$
4: while $|nodes| > 0$ do
5:     $r, n \leftarrow pop(nodes)$ {$r$ is the priority, i.e., target sample size, of node $n$}
6:     $totalFetched \leftarrow 0$
7:     for child $i$ in $children(n)$ do
8:         if $BB(i)$ is inside $A$ and $Level(n) > T$ then
9:             $r_i \leftarrow r \times \dfrac{w_i \times Overlap(BB(i), A)}{\sum_i w_i \times Overlap(BB(i), A)} - |C_i|$
10:         if $Level(n) < O$ then
11:             $r_i \leftarrow r_i / a_i$
12:         $s \leftarrow r_i$ random sensors under $i$
13:         $totalFetched \leftarrow totalFetched + |s|$
14:         $d \leftarrow$ probe sensors in $s$ and successfully collect data from available sensors
15:         $sample \leftarrow sample \cup d \cup c_i$
16:         else if $BB(i)$ overlaps with $A$ then
17:             $r_i \leftarrow r \times \dfrac{w_i \times Overlap(BB(i), A)}{\sum_i w_i \times Overlap(BB(i), A)}$
18:         if $Level(n) = O$ then
19:             $r_i \leftarrow r_i / a_i$
20:         $totalFetched \leftarrow totalFetched + r_i$
21:         $insert(nodes, r_i, i)$
22:     if $totalFetched < r$ then
23:         REDISTRIBUTE$(nodes, r - totalFetched)$
24: return $sample$

Fig. 12a

1:     $incr \leftarrow F \times \dfrac{priority(i)}{\sum priority(i)}$
2:     for node $i$ in $N$ do
3:         $priority(i) \leftarrow priority(i) + incr$

Fig. 12b

ONE-PASS SAMPLING OF HIERARCHICALLY ORGANIZED SENSORS

BACKGROUND

Sensors are devices that monitor and/or detect real world conditions. Most traditional sensors operate by converting energy of one form to another. There are several categories of simple sensors delineated as a function of the energy they detect including thermal, mechanical, optical, and acoustic, among others. For example, thermometers measure temperature, barometers gauge pressure, image sensors detect light, and microphones sense sound. These and other sensors can be combined and/or processed in various manners to produce more complex sensors. For example, images sensors and microphones are combined to produce video cameras and such cameras can further be modified to perform specific tasks. Further yet, location sensors or systems such as global positioning satellite (GPS) systems can be employed in conjunction with other sensors to contextualized data with geographical location information.

Large-scale sensor network deployment is increasing rapidly. For example, camera and/or inductive loop sensor networks are being employed to monitor motor vehicle traffic, and weather sensor networks are affording live weather conditions. Such networks generate tremendous volumes of useful data that can be utilized by applications to facilitate interaction by users, among other things. For instance, an application can provide a web portal that can host data generated by hundreds of sensors and enable users to query live data.

One emerging category of applications overlays sensor and other information on top of a map. Further, this data can be aggregated at multiple levels of granularity or resolution. This allows users to zoom in and out to obtain more or less detailed data from a geographic area of interest. For example, a user can acquire real-time data from a local camera, traffic sensor, or weather station.

Coupling data collection with query process presents a few challenges. First, collecting data from sensors on demand is expensive in terms of latency and bandwidth, especially when the query involves a large number of sensors. Second, sensors are largely heterogeneous in terms of their availability. Some sensors can be probed for data almost anytime and some others can only be probed when they are connected, working properly and have resources to sense and communicate. Furthermore, dynamically aggregating sensor data at various levels of resolution is computation intensive resulting in high end-to-end latency.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to efficient processing of sensor queries utilizing one-pass sampling over hierarchically organized structures. To efficiently and quickly collect and aggregate data over a multitude of sensors, a sample or subset of sensors are probed rather than attempting to acquire data from every relevant sensor in a query area. Moreover, in accordance with an aspect of the disclosure, sampling is performed within a hierarchically organized structure wherein sensors relevant to a query are identified and sampled in a single pass. In accordance with another aspect of the disclosure over sampling is employed to provide a probabilistic guarantee that a target sample size will be met in the presence of occasionally unavailable sensors. According to yet another aspect, caching can be utilized to expedite processing as well as aid satisfying a target sample size.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 12a is pseudo-code for implementing an exemplary sampling algorithm.

FIG. 12b is pseudo-code for implementing an exemplary redistribution algorithm.

DETAILED DESCRIPTION

Systems and methods described hereinafter pertain to efficient collection and processing of sensor data utilizing one-pass sampling. Rather than requiring data from all sensors within a query region to compute aggregate results only a subset of the sensors are employed to bound data collection cost per query. Moreover, sampling is incorporated with range lookup in a hierarchically organized structure so that both are accomplished in a single pass. Techniques are also provided addressing occasionally unavailable sensors and leveraging cached data.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
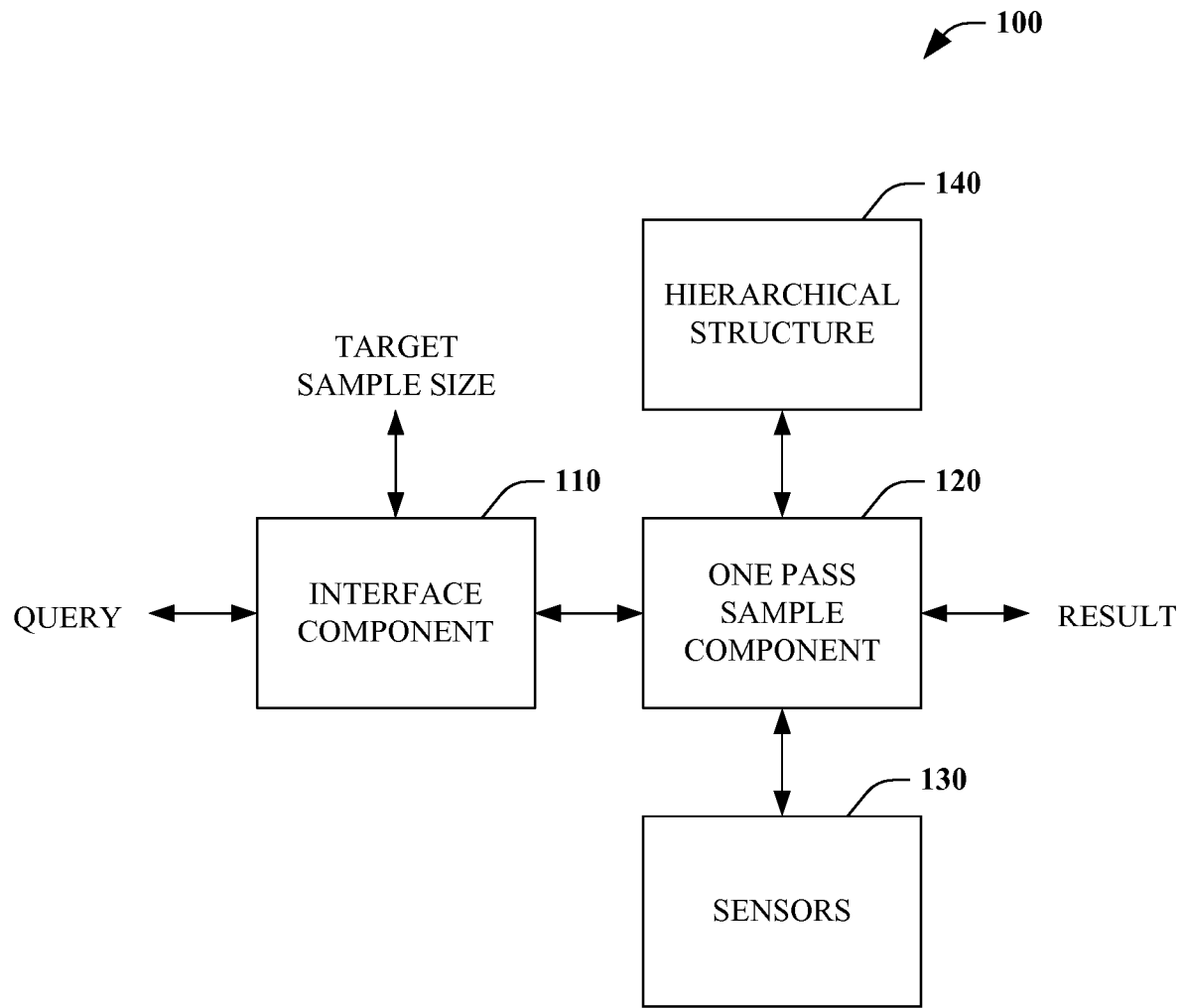
FIG. 1 is a block diagram of a query processing system in accordance with an aspect of the disclosure.

Referring initially to FIG. 1, a query processing system 100 is depicted in accordance with an aspect of the claimed subject matter. The query processing system 100 pertains to collecting, processing, and reporting of sensor data across various areas and/or resolutions. In one embodiment, the system 100 can form at least part of a system that presents sensor data and multi-resolution aggregates on top of a map or other spatial representation. For example, the system 100 can be a sensor data web portal that affords sensor data provided by multiple entities (e.g., individuals, groups, companies, governments . . . ) in accordance with spatial queries of various resolutions. While the system 100 is not limited to aforementioned embodiment, discussion will center on this embodiment to facilitate clarity and understanding with respect to various aspects of the claimed subject matter.

As shown, system 100 includes an interface component 110 communicatively coupled to a one pass sample component 120 (also referred to simply as sample component 120). The interface component 110 receives, retrieves or otherwise obtains or acquires a user query and optionally a target sample size. A query can correspond to a spatial view and/or resolution, among other things. The target sample size identifies a number of sensors to be utilized in generating aggregate values. This can be defined by a user with a query or provided as part of application preferences, policies, and/or default settings. The interface component 110 can be embodied as an application programming interface (API) and/or a graphical user interface (GUI), amongst others. An acquired query and/ or target sample size can be transmitted or otherwise made available to the sample component 120 by the interface component 110.

The sample component 120 provides sensor data results in accordance with a query. Where a query requests high-resolution data from a particular sensor, the sample component 120 can simply retrieve and return data from that sensor 130. At lower resolutions or levels of granularity, query results can be aggregates. For example, temperature can be aggregated at various resolutions including state, city, and region. In other words, regional sensors can be aggregated to provide city temperature, and city temperatures can be aggregated to provide state temperature.

Various granularities are captured by a hierarchically organized structure 140. The structure 140 can be a b-tree, an r-tree, a colr-tree or any other structure capable of recording data hierarchically. Each node represents a spatial area and identifies the number of sensors in that area. It is to be appreciated that the root can be the lowest level of granularity desired such as a country, continent, world, etc. The highest level of granularity can be sensors or groups of sensors. For example, the root can be the United States of America and the leaves can correspond to cities and sensors groups associated with the city.

The sample component 120 can employ information provided by the hierarchical structure 140 to fetch data from the sensors 130 for aggregation. More specifically, the sample component 120 can navigate the hierarchical structure 140 in response to a query to identify sensors 130 to ping. Consider temperature sensors and a state resolution, for example. While all sensors in the state could be pinged and data aggregated to provide an average temperature for the state, this would be computationally intensive and require long wait times for system users. Accordingly, sample component 120 can acquire data from a sample or subset of state sensors to reduce end-to-end latency.

In one implementation, sampling can be accomplished in two steps. First, the hierarchical structure 140 can be utilized to identify sensors associated with a query area. Once all the sensors are identified, a random subset of sensors can be selected and data fetched from the sensors, wherein the subset is bound in size by default or provided target sample size. Sampling data in this manner is a vast improvement over acquiring data from all spatially relevant sensors. However, further improvement is possible. In particular, latency can be further reduced by performing actions in a single pass rather than utilizing multiple passes as previously described. In accordance with an aspect of the claimed subject matter, sample component 120 operates in a single pass mode.

Figure 2:
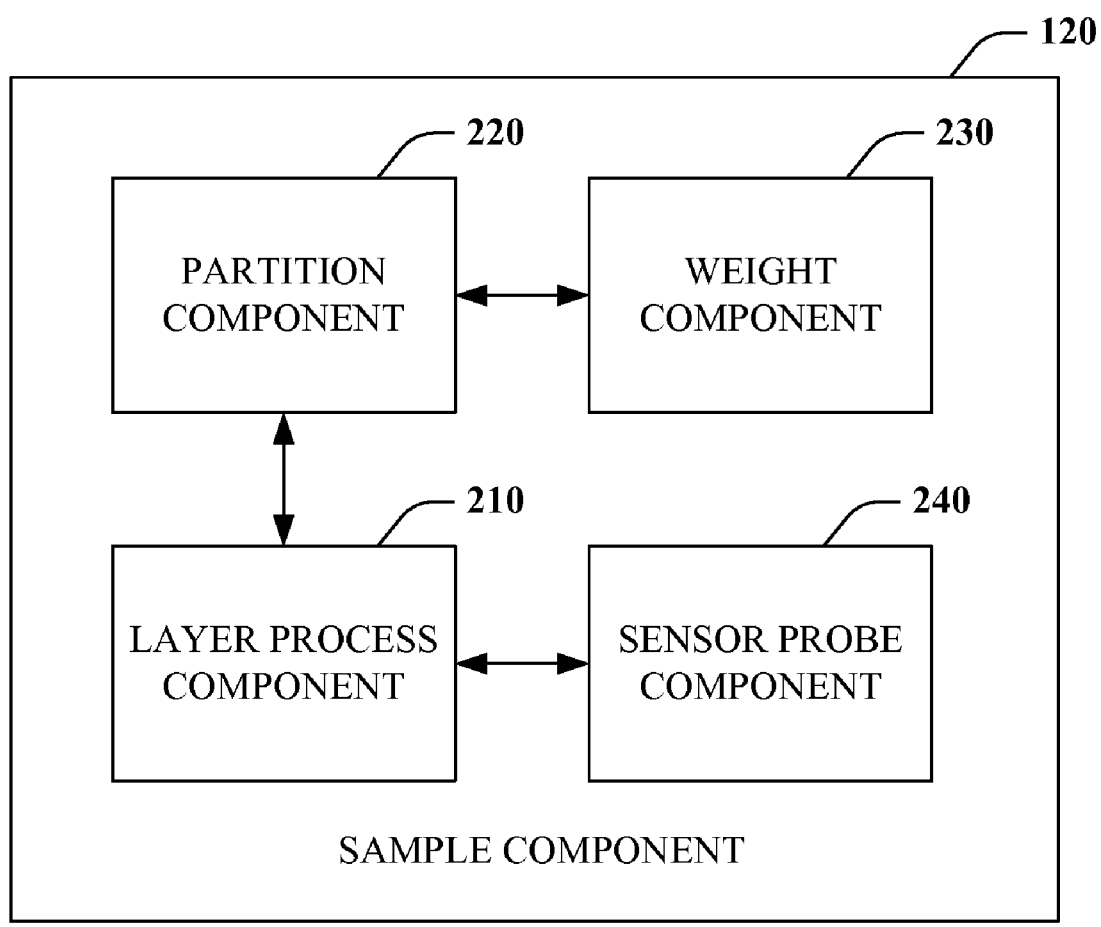
FIG. 2 is a block diagram of a representative one-pass sample component in accordance with an aspect of the disclosure.

Turing attention to FIG. 2, a representative one-pass sample component 120 is illustrated in accordance with an aspect of the claimed subject matter. Sample component 120 includes a layer process component 210 that processes a hierarchical structure layer-by-layer or level-by-level from root to leaves. At each layer, layer process component 210 can invoke the partition component 220 to partition or divide a target sample size amongst children of a parent node relevant to a query. Weight component 230 can be employed to identify a weight associated with each child node to enable partitioning based thereon. In a simple instance, weight can correspond to the number of sensors associated with each node. The partition component 220 can then divide the target sample size in proportion to the number of sensors attributed to each child node. Upon reaching one or more leaves, one or more sensors are identified as well as their determined sample size. The layer process component 210 can identify the determined number of sensors at random from those identified and provide them to sensor probe component 240 to fetch data from the sensors. This data can subsequently be aggregated and reported in response to the query.

Figure 3:
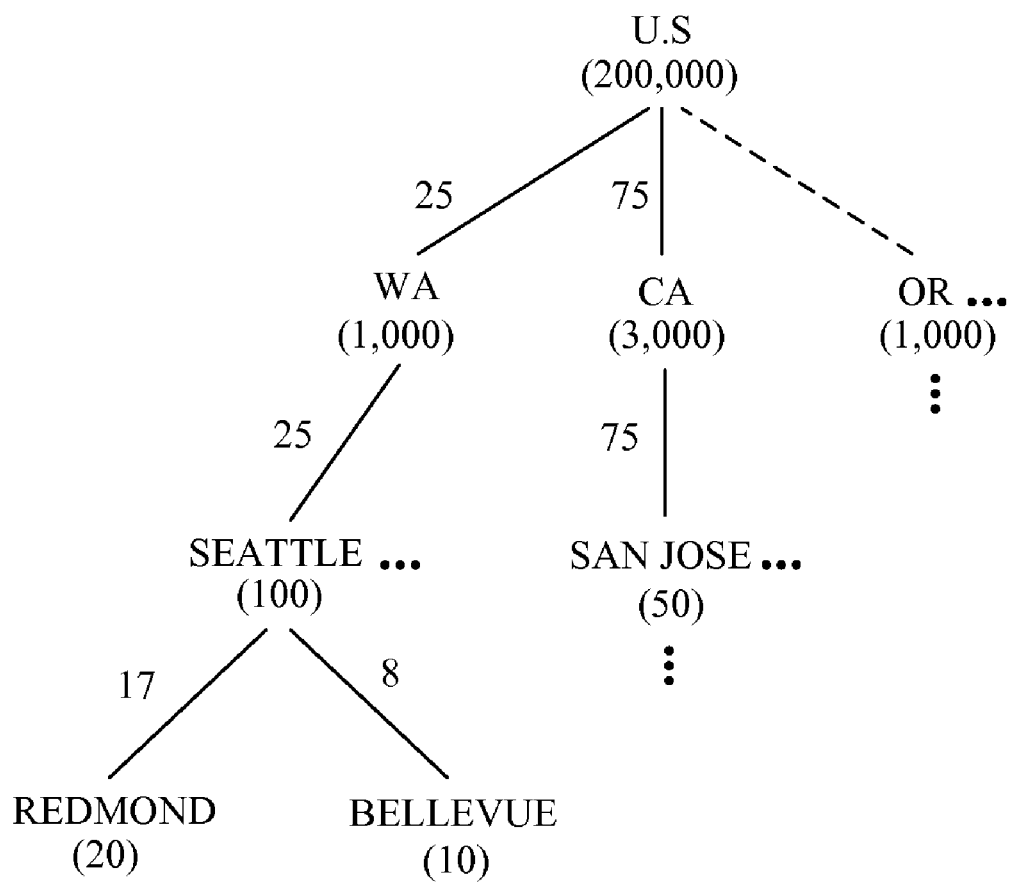
FIG. 3 depicts a hierarchical structure utilized in an example to aid clarity and understanding with respect to aspects of the disclosure.

To aid understanding, consider the partial hierarchical tree structure 300 of FIG. 3 and a query for temperature for Seattle, Wash. and San Jose, Calif. with a target sample size of 100. The root of the structure 300 is the United States including a total of 200,000 sensors. There is a sample size of 100 at the root that is to be redistributed amongst relevant children within a query area. Of all the child states, only Washington and California are relevant to the example query. Washington has a total of 1,000 sensors and California has 3,000 sensors. Accordingly, there is a 1:3 ratio of sensors between Washington and California. The target sample size can be split proportionally resulting in 25 sensors for Washington and 75 sensors for California. The target size can then be split further at each level until the leaf nodes are reached. In the case of Seattle, the leaf nodes are Redmond and Bellevue. At this point, the target sample size and associated sensors are known for each region—Redmond has a target sample size of 17 and 20 total sensors and Bellevue has a target sample size of 8 and 10 total sensors. Consequently, 17 sensors will be selected at random from Redmond's 20 and information fetched from those sensors. Similarly, 8 sensors from Bellevue's 10 sensors will be selected at random and information fetched from those sensors. The retrieved values can then be processed to produce an average temperature for Seattle. A similar, process can be followed with respect to San Jose. Overall, sensors are selected uniformly randomly to both distribute sensing load on sensors and provide more sensors from relevant areas with denser deployment.

Figure 4:
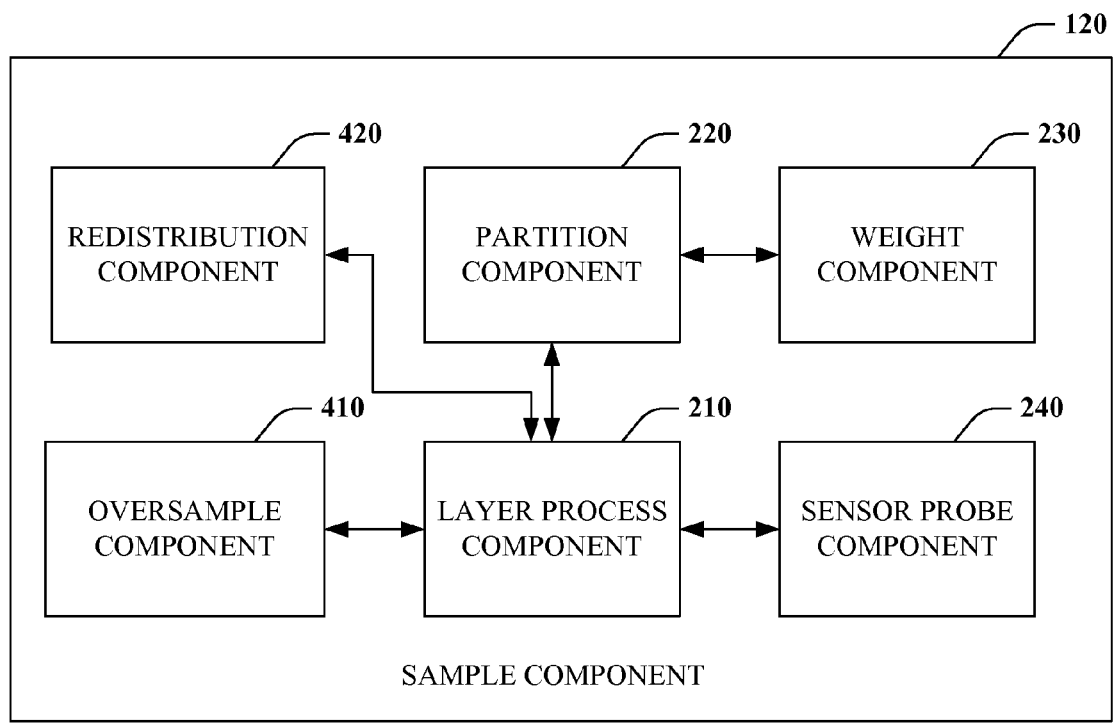
FIG. 4 is a block diagram of a representative sample component including overflow and redistribution subcomponents according to an aspect of the disclosure.

Referring to FIG. 4, another representative sample component 120 is depicted in accordance with an aspect of the claimed subject matter. In addition to the components previously described with respect to FIG. 2 including the layer process component 210, partition component 220, weight component 230 and sensor probe component 240, the sample component includes oversample component 410. An assumption was made with respect to the above description that if ten sensors are identified then data could be collected from all ten sensors. In practice, however, this may not be the case. Some sensor may be faulty while others may be dead or disconnected from a network. Therefore, probing a target number of sensors may not be sufficient since some sensors may be unavailable. Oversample component 410 addresses this issue by increasing the target size by a margin to increase the likelihood of acquiring data from at least the target sample size. For example, where a target sample size is one hundred, the oversample component 410 can scale the size up to one hundred and twenty. Alternatively, where one hundred sensors are partitioned between two states as above, rather than identifying twenty-five and seventy-five as the distribution, it could be increased to thirty and eight-five.

Figure 5:
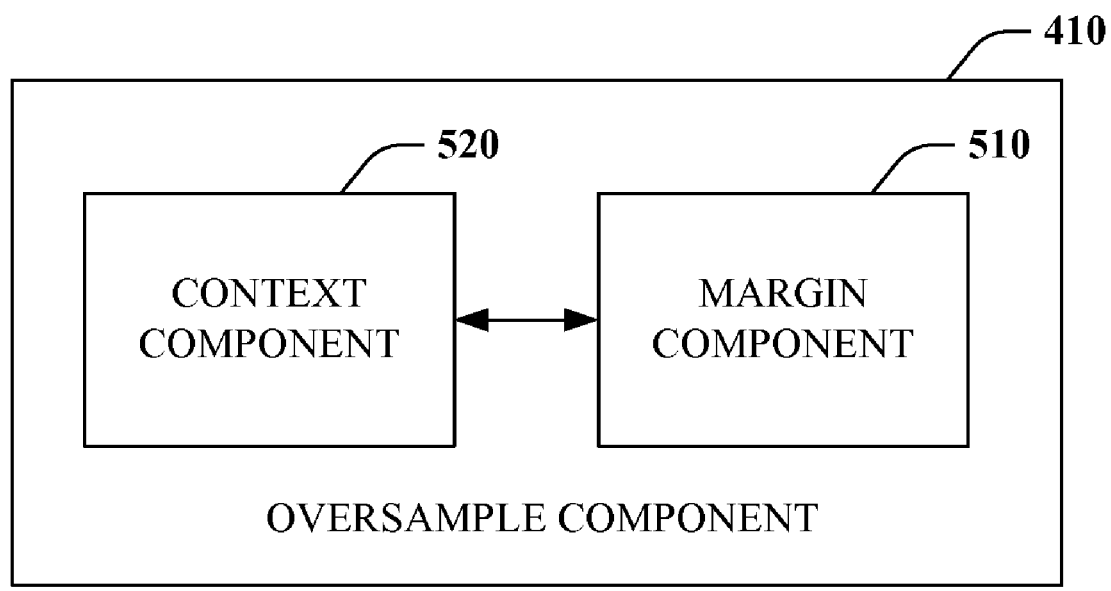
FIG. 5 is a block diagram of a representative oversample component according to an aspect of the disclosure.

Turning briefly to FIG. 5, a representative oversample component 410 is illustrated in accordance with an aspect of the claimed subject matter. As shown, the oversample component 410 includes a margin component 510 to identify a margin to be added to a target sample size to compensate for potentially unavailable sensors. In one instance, the margin component could simply identify a default margin (e.g., increase by 25%). For optimal performance, however, the margin selected should be as small as possible. Context component 520 can provide contextual information to the margin component 510 to facilitate margin identification or generation. For instance, the context component 520 can collect and provision historical availability associated with one or more sensors. By way of example, suppose it is known for a particular region that a portion (e.g., 10%) of sensors is always dead or otherwise unavailable. In this case, a margin can be produced of that portion. More complex techniques can also be employed such as machine learning. For example, the margin component 510 can infer or predict how many sensors will be available or alternatively unavailable as a function of time, date, day of week, and/or number of people trying to access data, among other things.

It is to be noted that while the probability that a randomly probed sensor will be available to produce readings could be computed by performing a query over the entire hierarchical structure 140 (FIG. 1), this would result in a two-pass process: first computing the probability of a query region and then using that probability during lookup. Instead, the target sample size can be scaled up at nodes within the query region. In one implementation, the sample size can be scaled up once in any path from the root to a node probing sensors. Of course, the claimed subject matter is not limited thereto.

Returning to FIG. 4, the sample component 120 also includes a redistribution component 420 communicatively coupled to the layer process component 210. Oversampling provides probabilistic guarantees for achieving a target sample size. However, sometimes the target may still fail to be reached due to non-deterministic sensor unavailability, among other things. Where the sample size is less than a target size for some nodes, redistribution component 420 can compensate for this by redistributing this difference among nodes yet to be probed. For example, where one path or branch is not able to acquire data with in a threshold level, the difference can be transferred to another branch. This increases the probability that a target sample size is achieved in the presence of irregularities.

Figure 6:
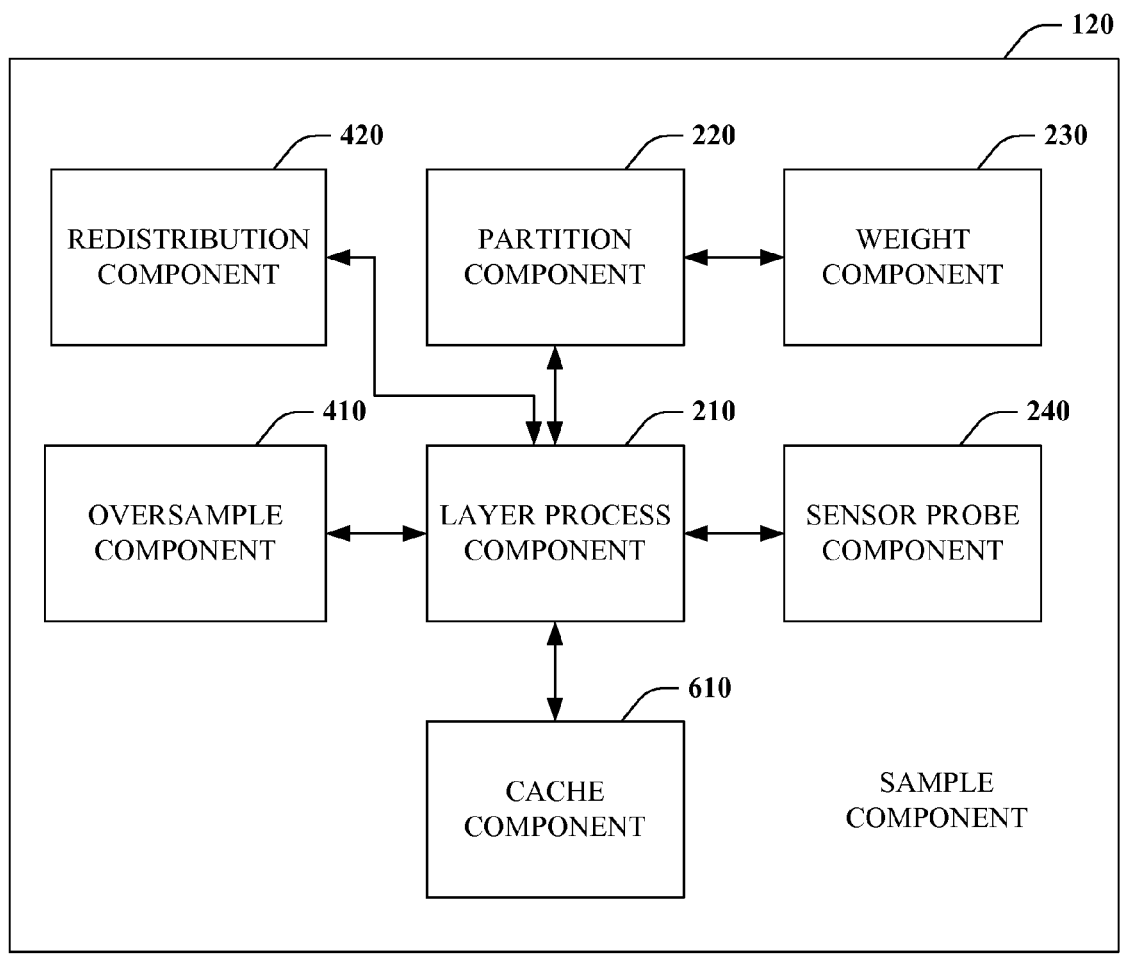
FIG. 6 is a block diagram of a representative sample component including a cache subcomponent according to an aspect of the disclosure.

Turning attention to FIG. 6, yet another representative sample component 120 is depicted in accordance with an aspect of the claimed subject matter. In addition to the components previously described with respect to FIG. 5, the sample component 120 also includes a cache component 610. The layer process component 210 need not request retrieval of all data from sensors via the sensor probe component 240. Rather, previously fetched data can be cached and utilized to expedite processing where appropriate with cache component 610.

Some sensor data is less transient that other data. In this case, it can be housed for a set period of time prior to requiring re-retrieval from a sensor. For example, temperature is not likely to change much, if at all, within a fifteen minute time period or window. Accordingly, once it is acquired it can be stored temporarily for reference. After expiration of an associated time period, this stale data is removed, replaced, or otherwise not referenced during processing.

In addition to expediting processing, the cache component 610 can impact oversampling and redistribution. Since some data can be retrieved from cache rather than directly from sensors, this increases the likelihood a target sample size can be achieved. Consequently, redistribution is less likely to be needed.

Furthermore, it is to be appreciated that the cache component 610 can cache and provide from cache more than raw sensor data. Aggregate data can also be cached. For example, aggregate temperature for the state of Washington can be cached for fifteen minutes. This improves query processing efficiency even further.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. For instance, the sensor probe component 240 can be external to the sample component 120. Further yet, one or more components and/or sub-components may be combined into a single component to provide aggregate functionality. For example, the interface component 110 could be provided within the sample component 120. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the sample component 120 can employ such mechanism to improve sampling though intelligent partitioning, oversampling and/or caching, among other things.

In view of the exemplary systems described supra, methodologies that may be implemented in accordance with the disclosed subject matter will be better appreciated with reference to the flow charts of FIGS. 7-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
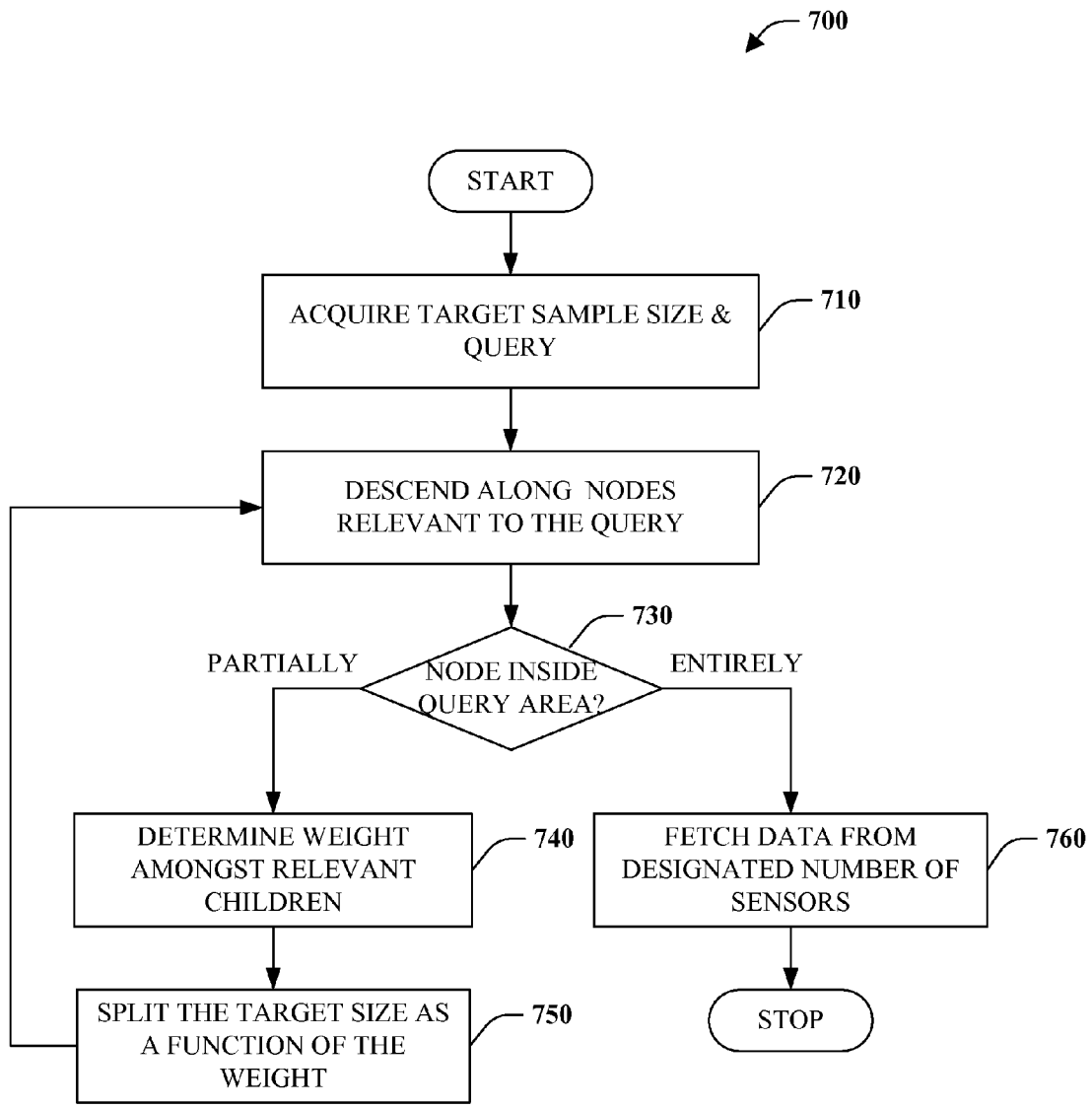
FIG. 7 is a flow chart diagram of a method of sensor sampling for query processing in accordance with disclosed aspects.

Referring to FIG. 7, a method of sensor sampling 700 for query processing is depicted in accordance with an aspect of the claimed subject matter. At reference numeral 710, a query and target sample size are acquired. Utilizing a hierarchically organized structure such as but not limited to a tree (e.g., r-tree, b-tree, colr-tree . . . ), the method descends to the next level along nodes relevant to the query at 720. From the root, this corresponds to navigation to children of the root. A determination is made at 730 as to whether a relevant node is entirely inside a query area or space or partially within the query area.

Nodes can be in one of three states generally—entirely inside the query area, partially within the query area, or outside the query area. A node is completely within the query area where no part of it is outside the query area. In other words, every part in the node area is within the query area. A node is partially within a query area when some part of it is inside the query area and another part is outside the query area. Stated differently, the node area and the query area intersect. This is the case where samples are split among children nodes. A node is outside the query area occurs when the node area and the query area do not share any parts. These nodes can be ignored.

If a node is not entirely inside the query area but is rather partially within the query area, the method 700 continues at reference 740 where weight is determined amongst relevant children. The weight can correspond to the number of sensors associated with a node, among other things. The target sample size at that point is split amongst relevant nodes as a function of the weight at 750. The method can then continue at reference 720 where the next level or layer is identified.

If at 730, it is determined that the area represented by the node is entirely inside the query area, the method proceeds to reference numeral 760 where data is fetched from a designated number or sensors at random, where the number corresponds to the target sample size for that node. Subsequently, the method can terminate or proceed with processing other branches (not shown). In the end, fetched data can be aggregated (e.g., min, max, sum, average . . . ) or otherwise processed and presented in response to the query.

Figure 8:
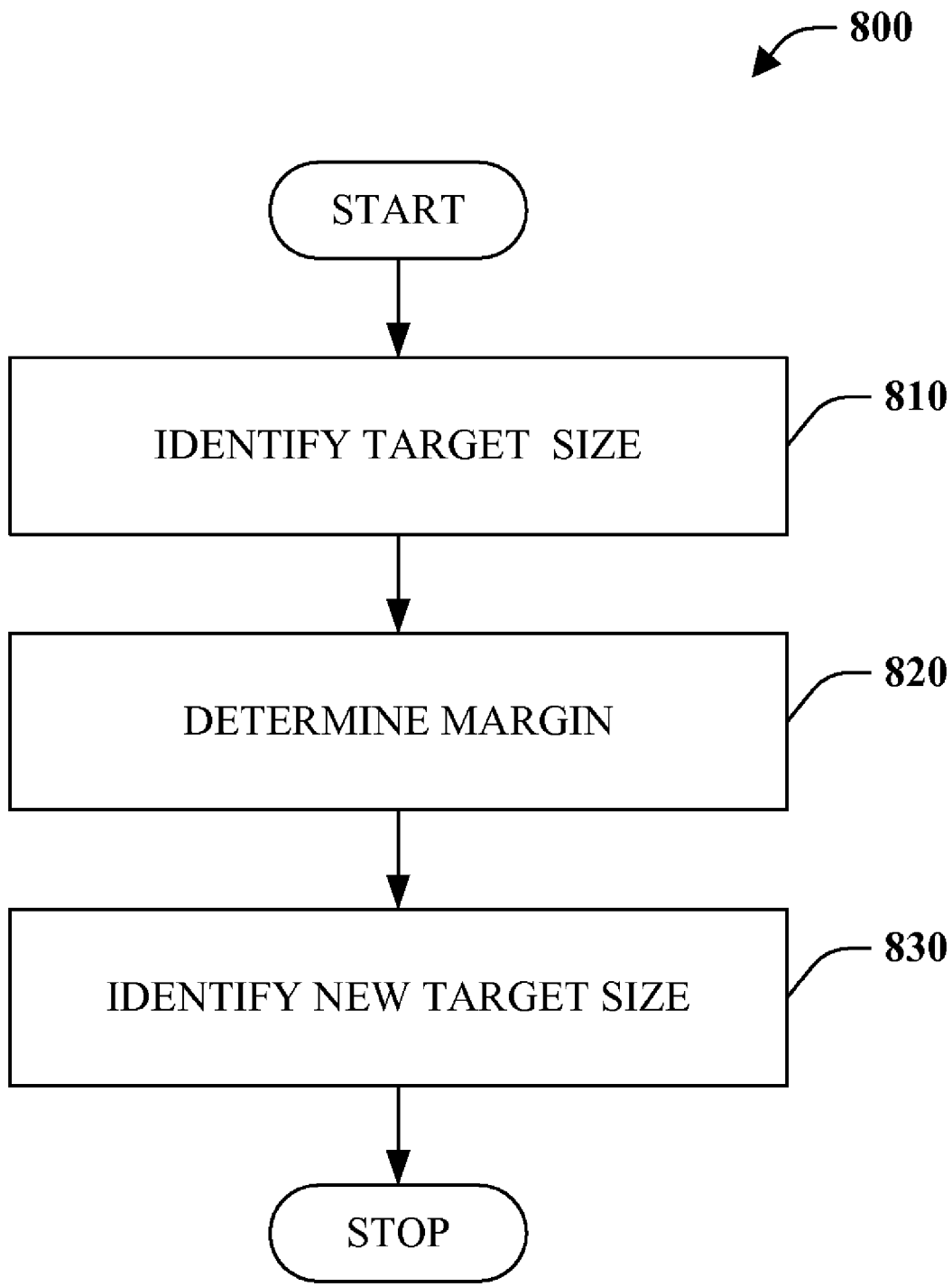
FIG. 8 is a flow chart diagram of a method of oversampling in accordance with an aspect of the disclosure.

FIG. 8 is a flow chart diagram of a method of oversampling in accordance with an aspect of the claimed subject matter. At reference numeral 810, a target sample size is identified. The target sample size can be a default value or a value specified with a query or associated preferences and/or policies, among other things. A margin is determined at numeral 820. The margin is a number of additional sensors that should be probed to ensure the target sample size in the presence of sensors that may be unavailable due to failure or network connectivity issues, inter alia. To determine a margin the probability of sensor availability or unavailability is be determined. This can be accomplished in many ways. In one particular implementation, historical availability of sensors can be tracked and utilized to predict future availability. Additionally or alternatively, other context information such as time, day, date, day of week and/or number of people access sensors can be utilized to predict availability. Once a margin is determined, it can be added to the target sample size thereby identifying a new target size.

Figure 9:
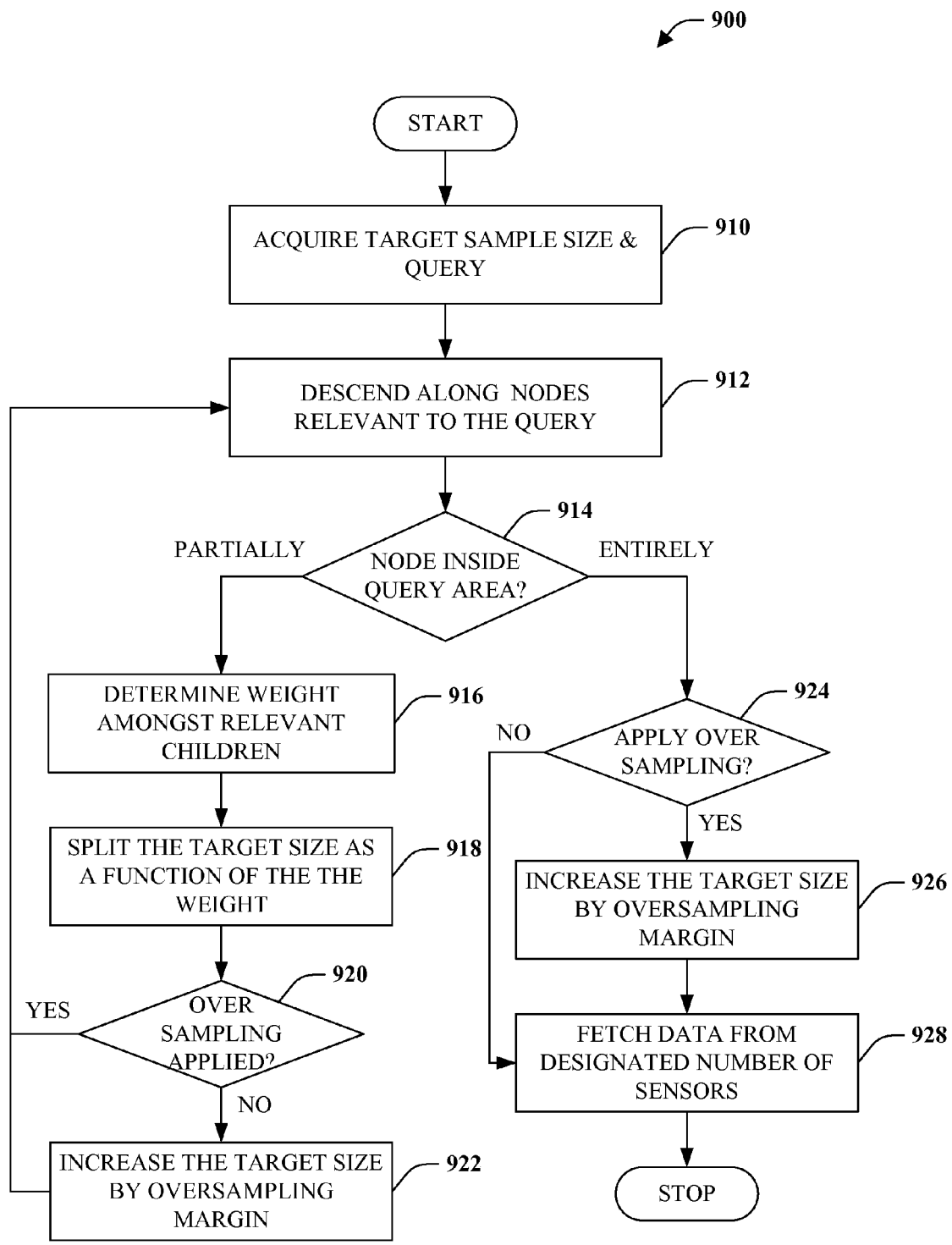
FIG. 9 is a flow chart diagram of a method of sampling including oversampling according to an aspect of the disclosure.

FIG. 9 illustrates a method of sensor sampling for query processing 900 that employs oversampling in accordance with an aspect of the claimed subject matter. At reference numeral 910 a query and target sample size are acquired. The method 900 then descends recursively along nodes relevant to the query at 912. At the root, this corresponds to navigating to children of the root. At reference 914, a determination is made as to whether the area represented by a relevant node is entirely within or inside a query area or partially within the query area.

If a node is partially within the query area (e.g., some part of it is inside the query area and some part is outside the query area), a weight for each node is determined amongst relevant children at 916. The target size is split as a function of the weight and associated with the relevant children at numeral 918. A determination is made at reference 920 as to whether over sampling has been applied to a node directly or indirectly (e.g., same path). If sampling has been applied, the method can continue at 912. Otherwise, the method proceeds to 922 where the target size is increased by an over sampling margin before continuing at 912.

If at reference 914, the node or nodes are entirely inside a query area, the method continues at 924 where a determination is made as to whether over sampling should be applied. This could correspond to determining whether oversampling has been previously applied, among other things. If yes, the target size is increased by an over sampling margin at 926 and the method proceeds to 928. If no, the method proceeds directly to reference 928 where the data is fetched from a designated number of sensors at random and the method terminates.

Figure 10:
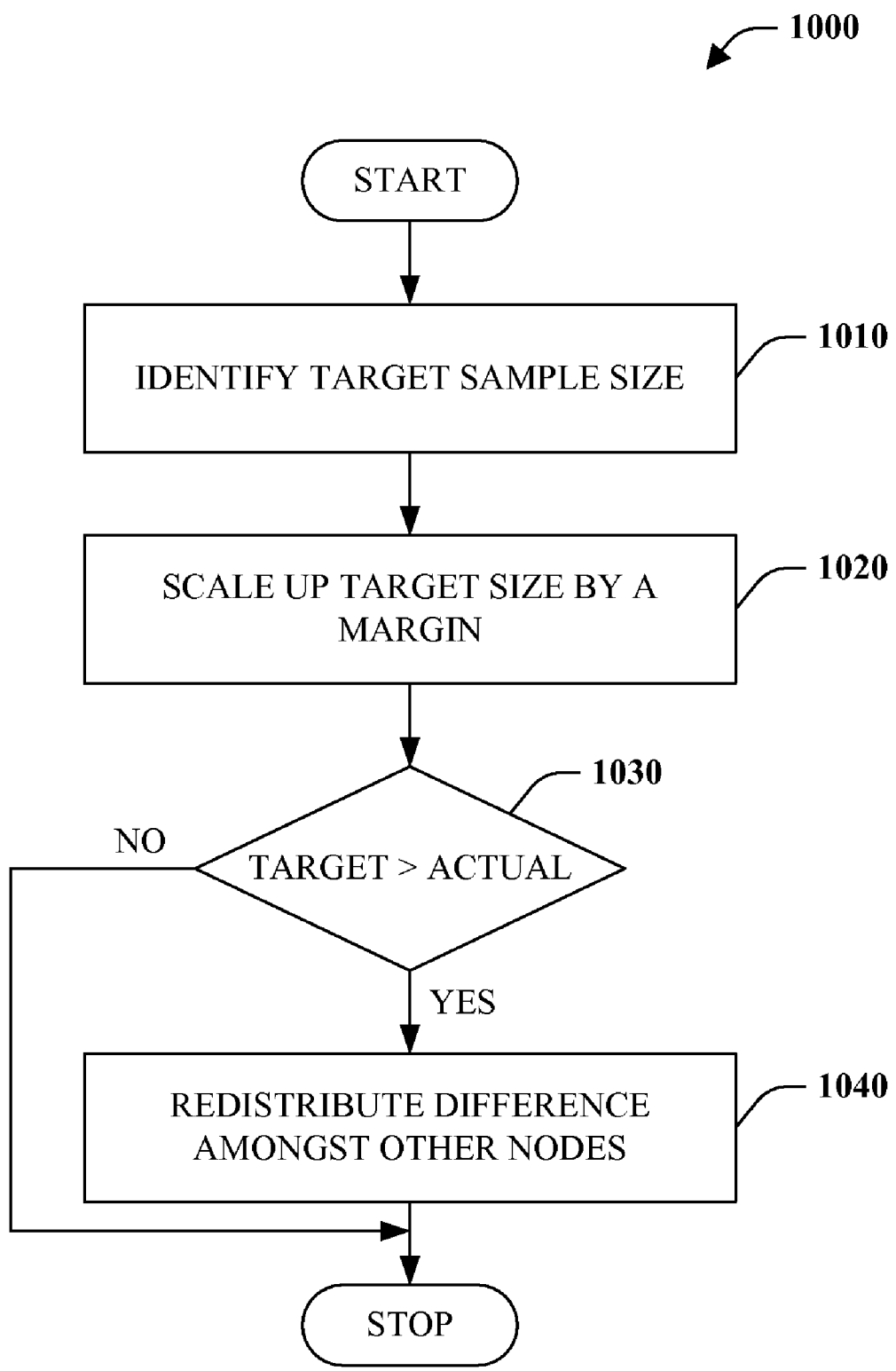
FIG. 10 is a flow chart diagram of a redistribution method according to an aspect of the disclosure.

FIG. 10 illustrates a redistribution method 1000 is in accordance with an aspect of the claimed subject matter. At reference numeral 1010, a target sample sizes is identified. The target sample size is scaled up by a margin at reference numeral 1020 to ensure the target size is ascertained in the presence of sensor unavailability. At numeral 1030, a determination is made as to whether the target size is greater than the actual sample size. Lag can exist between target and actual size due to nondeterministic sensor unavailability, among other things, that is not remedied by over sampling and the like. The relationship between target and sample size can be monitored at various nodes, levels, or processing stages to detect the existence of such lag. At reference 1040, an identified difference is redistributed to for processing against other nodes. For example, consider a scenario in which nodes A and B should return a total target size twenty and each node is designated a target size of ten. If during processing of node A it is determined that the actual size is eight, the difference of two can be added to node B such that node B's target size is now twelve and if successful the total target size of twenty is met.

Figure 11:
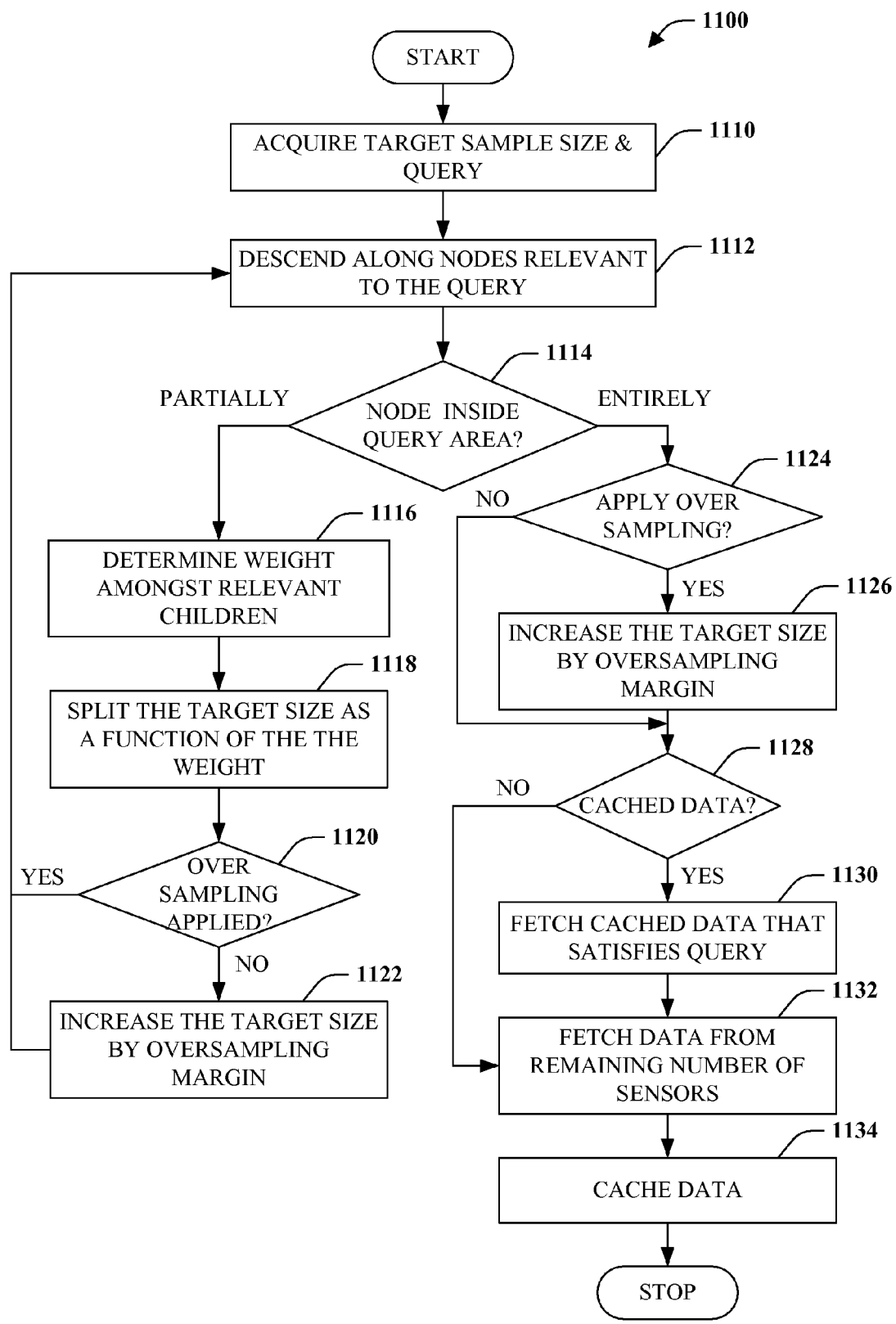
FIG. 11 is a flow chart diagram of a method of sampling employing cached data in accordance with an aspect of the disclosure.

Referring to FIG. 11, a sampling method 1100 associated with sensor query processing is illustrated in accordance with an aspect of the claimed subject matter. At reference numeral 1110, a query and target sample size are acquired or otherwise identified. From the root, the method descends to the next level or layer for processing at 1112. A determination is made at numeral 1114 concerning whether a relevant node is entirely inside a query space or alternatively is partially within the query space.

If a relevant node is partially within a query space or area, the method proceeds at 1116 where weight is determined for relevant nodes and target size is split as a function of this weight at 1118. If over sampling is determined to have been applied directly or indirectly for a node at 1120, the method continues at 1112. Otherwise, the target size is increased by a margin at 1122 prior to continuing at 1112.

If, at 1114, the relevant node is entirely inside the query space, the method continues at 1124 where another determination is made as to whether oversampling should be applied. If yes, the target size is increased by an over sampling margin at 1126 and the method proceeds to 1128. Alternatively, the method 1100 continues directly at 1128 where a determination is made as to whether any data associated with the node or sensors related thereto is cached If yes, randomly identified data that satisfies the query is retrieved from the cache at 1130 where available, and the method proceeds to 1132 to retrieve other data. If no data is cached as determined at 1128, the method continues to reference numeral 1132 where data is fetched from a designated number of random sensors (minus that retrieved from cache). Data acquired from sensors is cached for a period of time for later use at 1134 and the method terminates.

What follows are specific implementations of at least a few aspects of the aforementioned the claimed subject matter. It is to be appreciated that this is only one implementation. Other implementations are also possible and contemplated. Accordingly, the claims are not intended to be limited be the below implementation details.

Consider the sampling algorithm or pseudo-code provided in FIG. 12*a*. Input includes a number $R \geq 0$ of sensors to probe, an area of interest A, an over sampling level O, and a result threshold level T. From this input, a sample is output. The algorithm employs a plurality of variables and/or operators as shown in Table 1 below.

TABLE 1

| Variable/Operator | Definition |
|---|---|
| $w_i$ | weight of the node i |
| $c_i$ | cached sensors at node i |
| $a_i$ | mean availability of sensors below node i |
| BB(i) | bounding box of node i |
| Overlap($A_1$, $A_2$) | fraction of $A_1$ overlapping with $A_2$ |

Provided in FIG. 12*b* is a redistribution algorithm or pseudo-code, Redistribute(N, F). Required input includes a priority queue N of tree nodes with priority as the number of sensor probes assigned to the nodes, and a number of additional probes F to distribute amongst the given tree nodes. Priority(i) denotes the priority for a node i ∈ N.

The algorithm in FIG. 12*a* shows pseudo-code of a sampling algorithm that performs layered sampling. In addition to a target sample size R and a query region A, it takes two threshold levels O and T (the root is level 0). In the implementation, one sample (or aggregate computed over the sample) is returned for each non-leaf node at level T, and it can be adjusted based on the zoom level of on a map, for instance. For simplicity, the pseudo-code returns the union of all the samples. The other threshold O is used during oversampling (described infra). The algorithm has the following features:

The algorithm employs weighted partitioning of sample size. Layered sampling allows siblings in a hierarchical tree to independently choose their samples from their descendents. The difficulty with independent sampling lies in the ability to precisely control the size of the resulting sample. The following strategy is employed. Starting at the root, with a sample target size specified by the user, the algorithm descends along nodes relevant to the query, splitting the target size recursively amongst children. Thus, each child is asked to return a sample smaller than the original target size, so that consequently when the samples from each child are combined, the target size is met. Line 17 of the pseudo-code shows how a node partitions its sample size among its children. Each child node i gets a target size that is proportional to its weight $w_i$ normalized by the fraction of its bounding box overlapping with the query region. The weight $w_i$ can be defined to suit the desired semantics of the sampled answer. Here it is assumed applications want uniformity over sensors, and $w_i$ is set as the number of sensors descendent of node i.

The algorithm also provides for over sampling. To cope with sensor unavailability, a non-leaf tree node scales up the target sample size to R'>R such that when random R' of its descendent sensors are probed, R sensors are found to be available to provide data. To reduce probing complexity, R' should be as small as possible. However, an absolute guarantee of R out of R' successful probes is not feasible in practice since non-leaf nodes scale up the target size before sensors are actually probed and individual sensors may be found unavailable in nondeterministic ways. Moreover, nodes independently scale up their target sizes, and do not block while other sensors are accessed by other nodes. Therefore, a probabilistic guarantee is provided: R' is chosen such that when all of them are probed, an expected number of R sensors will be available to provide data.

To determine R', historical availability of individual sensors can be used, which has proved to be effective in predicting the future availability of the sensor. Suppose, the target sample size is R over m sensors ($s_1$, $s_2$, ..., $s_m$) with availabilities ($p_1$, $p_2$, ..., $p_m$). Then, the probability that a randomly probed sensor will be available to produce readings is $$a = 1/m \times \sum_{i=1}^{m} p_i.$$

The probability that exactly R sensors will be available out of R' probed sensors follows a negative binomial distribution, with an expected value of R'=R/a.

The value of a could be computed with a range query on a tree built over sensor availability information. However, this would result in a two-pass algorithm: first computing a over the query region, and then using it during lookup. Instead, during lookup, the target size can be scaled up by computing a at nodes whose bounding boxes BB are entirely within A (line 8). Such scaling up is done at nodes within a threshold level O such that the nodes have enough sensors under them to over sample. Finally, it is ensured that the sample size is scaled up exactly once in any path from the root to a node probing sensors, either at the first node below level T whose bounding box is entirely inside A, or the node at level O if no node above level O has its bounding box entirely inside A. This ensures correctness.

The above over sampling algorithm provides a probabilistic guarantee of achieving a target sample size and may sometimes fail to provide the target size. This may happen due to nondeterministic sensor unavailability, and holes and non-uniform distribution of sensors in bounding boxes. In such cases, if the sample size lags behind the target size for some nodes of the tree, the lag is compensated by the redistribute subroutine provided in FIG. 12b by evenly distributing it among nodes yet to be probed. This increases the probability that a target sample size is achieved even in the presence of sensor deployment irregularity.

Leaf and non-leaf caches can also be exploited. Before probing sensors, a node checks its cache for sensors that satisfy the query predicate. Only the additional number of sensors required to satisfy the target sample size are probed (line 9 and line 15).

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
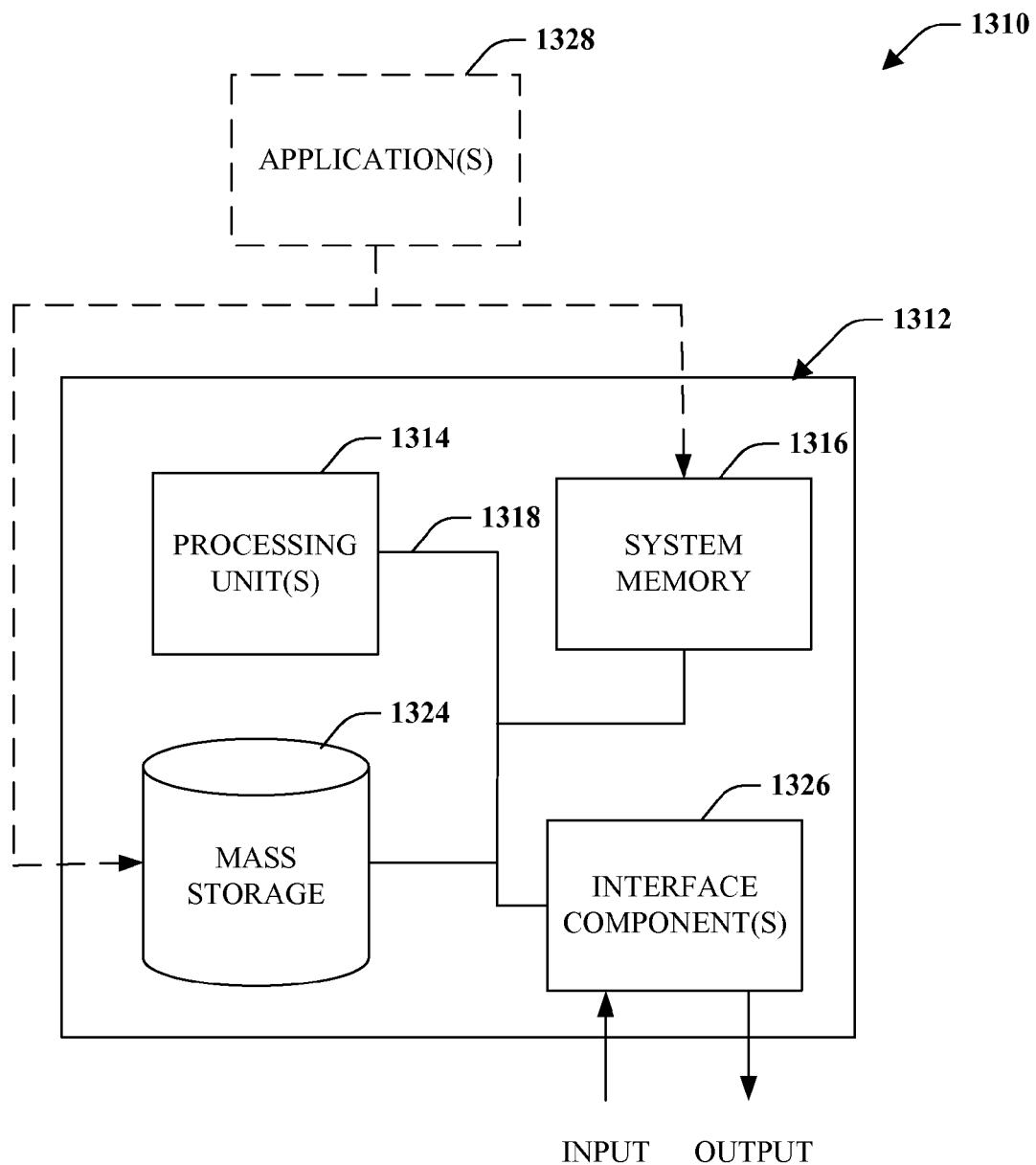
FIG. 13 is a schematic block diagram illustrating a suitable operating environment for aspects of the subject disclosure.
Figure 14:
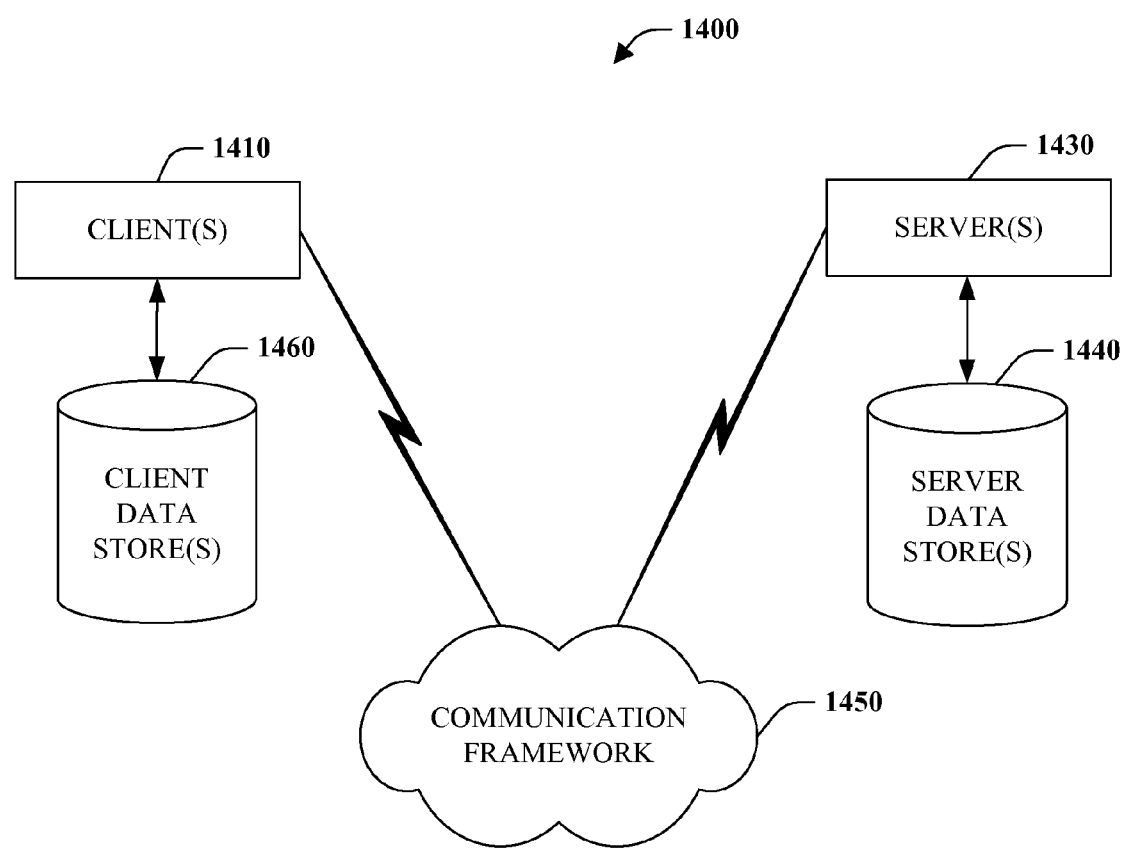
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented.

While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g. personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/non-volatile computer storage media. FIG. 13 illustrates, for example, mass storage 1324. Mass storage 1324 includes, but is not limited to, devices like a magnetic or optical disk drive, floppy disk drive, flash memory, or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g. serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1312 to output device(s) via interface component 1326. Output devices can include displays (e.g., CRT, LCD, plasma . . . ), speakers, printers and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the aspects of the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430.

Client/server interactions can be utilized with respect with respect to various aspects of the claimed subject matter. For example, a sensor query application can be afforded by server(s) 1430 and accessed by client(s) 1410 over the communication framework 1450. Additionally or alternatively, the client(s) 1410 can correspond to sensors that are accessed over the communication framework 1450 by server(s) 1430.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A query processing system, comprising at least one processor coupled to at least one machine-readable storage medium storing instructions executable by the at least one processor to implement:
   an interface component configured to provide a query;
   a sample component configured to probe a random subset of sensors to compute aggregate query results, wherein the subset is identified in a single pass over a hierarchical structure as a function of the query and a target sample size;
   an oversample component configured to increase the target sample size by a margin to increase a likelihood of acquiring data from at least the target sample size; and
   a margin component configured to determine a size of the margin by at least one of identifying a default margin or selecting an optimal smallest margin.

2. The system of claim 1, further comprising a partition component configured to recursively partition the target sample size amongst nodes at each hierarchical level.

3. The system of claim 2, further comprising a component configured to identify weight associated with each node to enable partitioning based thereon.

4. The system of claim 3, wherein the weight relates to a number of sensors associated with each node.

5. The system of claim 1, further comprising a context component configured to provision a historical availability of one or more sensors based on a known lack of availability of a portion of the one or more sensors in a particular region.

6. The system of claim 5, wherein the margin component is configured to predict a number of unavailable sensors as a function of at least one of time, date, day of week, or number of attempted accesses to the one or more sensors.

7. The system of claim 5, wherein the target sample size is increased exactly once in any path from a root to a leaf node associated with individual sensors.

8. The system of claim 5, further comprising a component configured to redistribute a sampling load to alternate nodes where sample size is less than the target sample size for at least one node.

9. The system of claim 1, further comprising a component configured to retrieve sensor data from a cache memory rather than directly probing sensors for at least one sensor.

10. The system of claim 1, wherein the hierarchical structure is one of an r-tree, a b-tree, or a colr-tree.

11. The system of claim 1, wherein the sample component is configured to report the aggregate query results.

12. A method of sensor sampling, comprising:
   identifying, in a single pass over a hierarchically organized structure, a random subset of sensors for acquiring data, in accordance with a query and a target sample size;
   increasing the target sample size by a margin of sensors for over-sampling, to increase a likelihood of acquiring data from at least the target sample size; and
   determining a size of the margin by at least one of identifying a default margin or selecting an optimal smallest margin.

13. The method of claim 12, further comprising:
   descending layer by layer in the hierarchically organized structure identifying sensors beginning at a root in accordance with the query; and
   splitting the target sample size among child nodes relevant to the query at each layer based on a weight associated with the child nodes.

14. The method of claim 12, further comprising increasing the target sample size by the margin, based on sensor unavailability.

15. The method of claim 14, further comprising, based on a predicted sensor unavailability, scaling up the target sample size by a non-leaf tree node such that when a random number of descendent sensors of the non-leaf tree node are probed, an expected number of sensors less than the random number will be available to provide data.

16. The method of claim 14, further comprising redistributing sampling among nodes yet to be probed where the target sample size lags behind a target size for at least some nodes to increase a probability that the target sample size is achieved in a presence of sensor deployment irregularity.

17. The method of 14, further comprising checking a cache for sensor data that satisfies a query prior to fetching data from sensors.

18. A computer-readable non-transitory storage medium storing instructions, the instructions if executed by a computing device causing the computing device to perform operations comprising:
  acquiring a query;
  performing a one pass sampling of a hierarchically organized structure to identify a random subset of sensors to probe to compute and return aggregate results to the query as a function of a target sample size;
  increasing the target sample size by a margin of sensors for over-sampling, to increase a likelihood of acquiring data from at least the target sample size; and
  determining a size of the margin by at least one of identifying a default margin or selecting an optimal smallest margin.

19. The computer-readable storage medium of claim 18, the operations further comprising predicting a number of unavailable sensors as a function of at least one of time, date, day of week, or number of attempted accesses to the one or more sensors.

20. The computer-readable storage medium of claim 19, the operations further comprising retrieving at least a portion of sensor data from a cache.

* * * * *